(12) United States Patent
Kilian

(10) Patent No.: US 8,659,395 B2
(45) Date of Patent: Feb. 25, 2014

(54) CONTAINER FOR RECEIVING ARTICLES

(76) Inventor: Dieter Kilian, Olching (DE)

( * ) Notice: Subject to any disclaimer, the term of this patent is extended or adjusted under 35 U.S.C. 154(b) by 19 days.

(21) Appl. No.: 13/459,418

(22) Filed: Apr. 30, 2012

(65) Prior Publication Data

US 2012/0211397 A1 Aug. 23, 2012

Related U.S. Application Data

(62) Division of application No. 12/419,176, filed on Apr. 6, 2009, now abandoned.

(30) Foreign Application Priority Data

Apr. 9, 2008 (EP) ..................................... 08007049

(51) Int. Cl.
*H04Q 5/22* (2006.01)
*G08B 13/14* (2006.01)
*G05D 1/00* (2006.01)

(52) U.S. Cl.
USPC ................ 340/10.1; 340/572.1; 701/1; 701/2

(58) Field of Classification Search
USPC ............................... 340/10.1, 572.1; 701/1, 2
See application file for complete search history.

(56) References Cited

U.S. PATENT DOCUMENTS

| | | | | |
|---|---|---|---|---|
| 4,117,490 A | * | 9/1978 | Arnold et al. ................. | 343/708 |
| 5,311,973 A | * | 5/1994 | Tseng et al. .................... | 191/10 |
| 5,491,483 A | * | 2/1996 | D'Hont ............................ | 342/42 |
| 6,020,856 A | * | 2/2000 | Alicot ............................ | 343/742 |
| 6,335,686 B1 | * | 1/2002 | Goff et al. .................. | 340/572.4 |
| 6,362,786 B1 | * | 3/2002 | Asano et al. ........... | 343/700 MS |
| 6,392,543 B2 | * | 5/2002 | Maloney .................... | 340/568.1 |
| 6,608,551 B1 | * | 8/2003 | Anderson et al. .......... | 340/10.51 |
| 6,614,402 B1 | * | 9/2003 | Wendt et al. ................ | 343/713 |
| 6,898,489 B1 | * | 5/2005 | Hayes, Sr. ........................ | 701/1 |
| 6,956,538 B2 | * | 10/2005 | Moore .......................... | 343/878 |
| 7,209,087 B2 | * | 4/2007 | Tang et al. ..................... | 343/702 |
| 7,239,242 B2 | * | 7/2007 | Ghosh ........................ | 340/572.1 |
| 7,253,716 B2 | * | 8/2007 | Lovoi et al. .................. | 340/10.1 |
| 7,400,298 B2 | * | 7/2008 | Fogg et al. ............. | 343/700 MS |
| 7,420,467 B2 | * | 9/2008 | Patenaude et al. ......... | 340/572.1 |
| 7,453,359 B2 | * | 11/2008 | Watanabe et al. .......... | 340/572.1 |
| 7,453,373 B2 | * | 11/2008 | Cumeralto et al. ....... | 340/870.02 |
| 7,504,951 B2 | * | 3/2009 | Phipps et al. ............. | 340/572.7 |
| 7,557,714 B2 | * | 7/2009 | Roeder et al. .............. | 340/572.7 |
| 7,598,868 B2 | * | 10/2009 | Lee et al. .................... | 340/572.1 |
| 7,812,731 B2 | * | 10/2010 | Bunza et al. ................ | 340/573.5 |
| 7,849,107 B2 | * | 12/2010 | Schuessler .................... | 707/803 |
| 7,855,663 B2 | * | 12/2010 | Wilbrink et al. ............. | 340/933 |
| 2002/0109610 A1 | * | 8/2002 | Katz .......................... | 340/932.2 |
| 2003/0117328 A1 | * | 6/2003 | Sievenpiper et al. ......... | 343/713 |
| 2004/0021610 A1 | * | 2/2004 | Hickel .......................... | 343/713 |

(Continued)

FOREIGN PATENT DOCUMENTS

DE 102007034437 A1 * 5/2008

*Primary Examiner* — Daniel Wu
*Assistant Examiner* — Kam Ma
(74) *Attorney, Agent, or Firm* — Fitch, Even, Tabin & Flannery LLP

(57) ABSTRACT

The invention provides a container (10) comprising a, a receiving compartment (18) for receiving articles (12) each provided with an RFID transponder (14), a shielding (16) for shielding of the receiving compartment (18), and an RFID antenna device (20) located in the receiving compartment (18) for communication with the transponders (14). Reliable identification of articles (12) located in the container (10) can thus be simplified considerably.

16 Claims, 9 Drawing Sheets

(56) References Cited

U.S. PATENT DOCUMENTS

| | | | |
|---|---|---|---|
| 2004/0070497 A1* | 4/2004 | Laurosch et al. | 340/522 |
| 2005/0035847 A1* | 2/2005 | Bonalle et al. | 340/5.61 |
| 2005/0035852 A1* | 2/2005 | Paulsen | 340/438 |
| 2005/0156739 A1* | 7/2005 | Maloney | 340/572.1 |
| 2005/0156757 A1* | 7/2005 | Garner | 340/907 |
| 2005/0253726 A1* | 11/2005 | Yoshida et al. | 340/572.8 |
| 2006/0022827 A1* | 2/2006 | Higham | 340/572.1 |
| 2006/0114121 A1* | 6/2006 | Cumeralto et al. | 340/870.02 |
| 2007/0008280 A1* | 1/2007 | Ullmann | 345/156 |
| 2007/0046552 A1* | 3/2007 | Marino | 343/720 |
| 2007/0080804 A1* | 4/2007 | Hirahara et al. | 340/572.1 |
| 2007/0222606 A1* | 9/2007 | Phipps et al. | 340/572.7 |
| 2008/0068173 A1* | 3/2008 | Alexis et al. | 340/572.7 |
| 2008/0158071 A1* | 7/2008 | Kebel et al. | 343/705 |
| 2008/0169985 A1* | 7/2008 | Hubmer et al. | 343/702 |
| 2009/0167500 A1* | 7/2009 | Braun et al. | 340/10.1 |
| 2009/0195363 A1* | 8/2009 | Downie et al. | 340/10.4 |
| 2009/0231140 A1* | 9/2009 | Hong et al. | 340/572.7 |
| 2009/0256680 A1* | 10/2009 | Kilian | 340/10.1 |
| 2010/0036369 A1* | 2/2010 | Hancock | 606/33 |
| 2010/0225549 A1* | 9/2010 | Kittinger et al. | 343/721 |
| 2010/0309024 A1* | 12/2010 | Mimeault | 340/932.2 |
| 2011/0140859 A1* | 6/2011 | Fogg et al. | 340/10.1 |
| 2012/0211397 A1* | 8/2012 | Kilian | 206/719 |
| 2012/0284209 A1* | 11/2012 | Duffy et al. | 705/418 |

* cited by examiner

CONTAINER FOR RECEIVING ARTICLES

This application is a Divisional of U.S. Pat. No. 12/419,176, filed on Apr. 6, 2009, and claims Paris Convention priority of EP 08007049, filed on Apr. 9, 2008, the complete disclosures of which are hereby incorporated by reference for all purposes.

BACKGROUND OF THE INVENTION

1. Field of the Invention

The present invention relates to a container for receiving articles such as, for example, a shopping cart for receiving goods, a sea freight container for transporting goods, a roll container which can be used in passenger aircraft for holding food and drink, a "rack" (e.g. IT server rack) for installing electrical and electronic devices etc.

In many areas of application it is desirable to be able to detect and identify articles actually accommodated in a container as simply and rapidly as possible.

2. Description of the Prior Art

RFID ("radio frequency identification" is a known technique for wireless identification of objects which has been used for some time in the area of so-called auto-ID, i.e. the automatic supply of information to persons, animals, goods, and articles.

Each auto-ID system is based on using artificial identification features to allow machine identification. The barcode labels still widely used today, which revolutionized the auto-ID area many years ago, are now becoming increasingly irrelevant to the cases of application which are gaining in importance today. One disadvantage of barcodes is frequently the low memory capacity for information, which also cannot be amended subsequently. In addition, the readout or readoff ("scanning") of data is relatively inconvenient and time-consuming (visual contact is required).

These disadvantages can be eliminated with RFID. A large variety of RFID systems and methods are known per se. Merely as an example, reference may be made on this matter to the "RFID Handbook", $3^{rd}$ edition, Klaus Finkenzeller, Carl Hanser Verlag, Munich, Vienna 2002.

An RFID system consists of at least one reader for reading out data which are stored in a transponder, wherein the data transmission between transponder and reader takes place by means of electromagnetic waves. At lower frequencies, this takes place inductively via the near field, at higher frequencies via the electromagnetic far field. The reader, like the transponder, also can function as a transmitter and as a receiver for electromagnetic radiation. Inductively coupled systems possess a comparatively small range. Typical representatives of this variant are, for example, contactless chip cards and automatic access systems. On the other hand, systems with electromagnetic far-field coupling have a comparatively large range. Common frequencies of RFID systems with far field coupling lie in the order of magnitude of several hundred MHz. Frequently, quite specific frequency ranges are legally prescribed such as, for example, 865-869.5 MHz or 2.45 GHz.

In practice, many problems arise with the RFID systems and methods used at the present time, which make it difficult if not impossible to use RFID technology in many areas of application.

A first series of problems relates to the reliability of the technology. In this respect, there is a desire to identify all the transponders located in a detection zone of the respective reader and to read out data stored in these transponders free from error (and optionally to modify this free from error). In practice, however, this is prevented by, for example, interference of a plurality of RFID readers among one another, interference due to spontaneous radio emissions in the environment, interference due to other radio equipment and sometimes due to sabotage by interfering transmitters.

Another range of problems is data security. In this respect, for example, there is the risk of listening in to the data communication and the risk of spoofing information. Communication between an RFID reader and transponders is substantially comparable to a normal radio link between a transmitter and a receiver. An external eavesdropper can listen in on, falsify, simulate individual bit patterns or make the receiver unserviceable by overloading information in a manner similar to a denial-of-service (DoS) attack.

Known RFID systems have so far frequently failed because of the problems described above, particularly for identifying articles located in a container. Merely as an example, mention may be made of the hitherto previously unsuccessful experiments to detect the contents of shopping carts pushed past a checkout desk in a supermarket by means of an RFID system, that is, to identify separately and reliably the transponders integrated on or in the goods for each shopping cart. In this case of application, data transmission between transponder and reader is impaired, for example, by metal structures of the articles (e.g. tin cans) and also of the container (e.g. metal shopping carts).

OUTLINE OF THE INVENTION

It is an object of the present invention to simplify reliable identification of articles located in a container.

This object is substantially achieved according to the invention by a shielding of the container. The dependent claims relate to advantageous further developments of the invention. These further developments can be provided individually or in an arbitrary combination. The container can, for example, comprise a component of an RFID system.

The invention in particular provides a container for receiving articles each provided with at least one RFID transponder, comprising an RFID antenna device for communication with the transponders, which is located in a shielded region of the container.

This makes particularly simple and reliable communication possible between a reader and the individual RFID transponders which, together with the RFID antenna device, are located in a shielded receiving compartment of the container. In particular, the invention simplifies unique assignment of the data exchanged between reader and RFID transponders to the individual physical objects. This is particularly important in many cases of application.

In the transponders which can be used, which can be attached, for example, in the form of labels ("RFID tags") or the like on or in goods or articles, or which can be integrated in their packaging, different types can be distinguished: active transponders have their own power supply e.g. in the form of a battery. Passive transponders on the other hand use the radiation energy of an RFID transponder (which, for example, can be integrated in the reader) for transmitting their own information to the reader. The invention can be used in particular very advantageously for this type of transponder. So-called semi-passive transponders represent a mixed form which, for example are merely equipped with a weak support battery which is used for transmitting their own information as soon as the transponder has been "woken from sleep" by the RFID system (e.g. by the reader).

Surprisingly, the very disadvantageous effects of a shielding in the prior art are transformed into a series of serious advantages in the invention. A first advantage, for example, consists in that the antenna device (comprising one or more antennae) is located in the immediate vicinity of the articles (and therefore transponders) without interposed shielding, which simplifies communication. A further advantage consists in avoiding interferences between identification processes which are carried out on different containers which are, however, located in spatial proximity to one another. A further advantage consists in that the communication is not impaired by spontaneous radio emissions in the surroundings or other external noise sources. Finally, another advantage consists in that unauthorized listening-in to the communication is considerably simplified.

In a preferred embodiment, the shielding surrounds the receiving compartment used to receive the articles for the most part, in particular substantially completely.

In one embodiment, the shielding is configured in such a manner that this absorbs at least 50%, in particular at least 60% of the radiation power of the RFID antenna device.

In most countries, RFID systems as radio engineering installations are subject to very restrictive legal regulations. These regulations can relate, for example, to the frequencies of the electromagnetic radiation used and/or the power at which the transmitter or transmitters of the system are operated. In this regard, a surprising advantage of the invention is that depending on the design, the RFID antenna device can be operated almost independently of such legal regulations. The RFID system can advantageously be implemented throughout the world, at any location, at any time and with any radio wavelength and power.

In one embodiment it is provided that a radiation wavelength of the RFID antenna device lies in a range of 0.8 to 8 GHz.

In one embodiment it is provided that a radiation wavelength of the RFID antenna device lies in a range which is legally prohibited for the operation of radio engineering installations.

In a preferred embodiment, a radiation power of the RFID antenna device is so high that the operation of the RFID system would be legally prohibited without the shielding. This radiation power can, for example, be at least a factor of 2, in particular at least a factor of 5 higher than the permissible radiation power (without shielding).

In one embodiment it is provided that the transmission power of the RFID antenna device is at least 5 W, in particular at least 10 W.

In addition to an increased transmission power beyond the relevant standard (for better RFID read results), the possibility is advantageously also considered to provide RFID transmitters and readers more simply, cheaply and more robustly with regard to their HF structure.

In a preferred embodiment it is provided that the shielding is achieved by means of at least one electrically conducting housing structure of the container.

In a manner known per se, a flat extensive, electrically conductive material layer, e.g. a metal sheet or a metal film is considered as shielding (alternatively, for example, conducting plastic or conducting composite materials). For most of the cases of application or radiation wavelengths of particular interest here, however, the principle of the Faraday cage can be advantageously used within the scope of the invention and the shielding formed from an electrically conductive grid or network structure.

Such a grid or network structure can advantageously be achieved with comparatively simple, in particular even commercially available materials. In one embodiment, the structure, for example, comprises metal rods and/or perforated metal sheet and/or wire mesh and/or wire netting. For example, individual elements spanned with wire mesh (e.g. metal frame) can be prefabricated in variable size to for a shielding module.

In particular, shielding walls or entire shielding cages of different size can be composed from the prefabricated components in a modular fashion using the aforesaid shielding components.

When using a shielding component which is not extensively continuously electrically conductive but a mesh or network structure, a characteristic structural spacing (e.g. the mutual spacing of metal rods, the mesh width of a wire mesh, or a hole diameter of a perforated metal) is preferably at least a factor of 2, in particular at least a factor of 5 smaller than the wavelength of electromagnetic radiation of the system. For a frequency of about 870 MHz corresponding to a wavelength of about 30 cm, for example, a characteristic spacing (e.g. mesh width) of about 15 cm or less (e.g. 3 cm) is thus obtained.

In one embodiment it is provided that the shielding comprises a plurality of successively disposed shielding layers, e.g. two or three grid or network structures of the aforesaid type. Such a multilayer shielding structure makes it possible, for example, to achieve increased absorption of radiation power in the shielding material. The plurality of shielding layers can in this case be provided to be of the same type or of different type (e.g. with different characteristic spacing such as, for example, mesh width).

Within the scope of the present invention, a multilayer structure of the shielding or individual shielding components also has a completely different essential importance; if the mutual spacing of successively arranged shielding layers is approximately of the order of magnitude of the relevant radiation wavelength, which can easily be accomplished in the cases of application of particular interest here, the shielding effect can be drastically varied in a specific manner by selecting a specified mutual spacing. Depending on the specific dimensioning of this mutual spacing, electromagnetic waves reflected at the various shielding layers can interfere, for example, destructively or constructively. In the first case, a minimal reflection and maximal absorption is achieved whereas in the second case the shielding effect includes a maximum reflection component. The damping i.e. the reduction in the radiation power due to passage through the shielding remains unaffected thereby.

Maximum reflection can be appropriate, for example, when no "dead angle" is desired from the radio engineering viewpoint within a detection zone in the container interior delimited by the shielding.

The term "identification" (of transponders) is to be understood very broadly in the sense of the present invention and should comprise all types of information and/or data transmission from the transponder to the reader. In the simplest case, this comprises, for example, "1 bit information" (transponder in the container or not). Of greater practical importance, however, are more complex data which are stored in the area of the transponder and are at least partially read out (e.g. so-called EAN code of an article or "tracking code" of a production in the production material flow). In this case, it is in no way excluded and frequently even preferred that during the "identification process", an information or data transmission takes place in the reverse direction.

In contrast to this, there can be cases, for example when the radiation power of a reader is to be matched or tuned exactly to the antenna of the transponder, in which highest possible absorption of transmission power in the shielding is expedient.

In one embodiment it is provided that at least part of the shielding is configured as a gate which in an open position allows the insertion and removal of articles provided with transponders and which shields in a closed position.

The term "gate" is to be understood very widely here and for example, comprises plate-shaped or door-shaped movable shielding components such as, for example, flaps, pivotable doors, sliding doors, and swing doors.

In a preferred embodiment of the invention it is provided that the container further comprises an externally accessible connection device. Such a connection device can fulfill various purposes. Initially, the actual RFID reader can thus be arranged externally and connected via the electrical connection device to the RFID antenna device located in the receiving compartment of the container. An application example for this is, for example, a shopping cart to which the checkout operator in a supermarket connects a cable which connects the antenna located in the shopping cart to a reader located in the checkout area.

Even if the RFID reader is integrated on or in the container, an externally accessible electrical connecting device can be of practical benefit, i.e. for example, to supply the reader with electrical energy and/or to accomplish a cable-bound data communication with an external device. Furthermore, such an electrical connecting device can also be provided to connect the articles contained in the container to an external device, for example, if the articles are electrical or electronic appliances. In this case, a power supply and/or communication with the appliances can be accomplished via the connection device and an external cabling. Finally, an electrical connecting device can also be provided or supplying and/or for communication with devices which, according to further developments of the invention, can be integrated on or in the container. An example of this is a sensor device explained in further detail below.

In an advantageous embodiment, the electrical connection device of the container at the same time serves a plurality of the aforesaid purposes.

The electrical connection device can be provided in particular as a plug connection device (plug or socket).

If an RFID system is operated with a plurality of containers according to the invention, respective electrical connection devices can also be used to construct a "bus system". For example, individual readers integrated on or in the containers can be controlled by means of such a bus system or their detection data transmitted to a central device which is also connected to the bus system.

In one embodiment, the container is configured as a retaining device with retaining means for accommodated articles. An example of this is a container (so-called "rack") specially provided for accommodating electrical or electronic appliances. Another example of this is the roll container, already mentioned initially, which can be used in an aircraft for receiving food and/or drinks in predefined receiving positions for the individual articles. In particular, for containers having predefined receiving positions for the individual articles, it can be provided for the relevant REID system that not only the articles located in the container but also their positions are identified.

In one embodiment it is provided that the container itself is provided with an RFID transponder so that the individual containers can also be identified in an RFID container operated for several containers.

If such a transponder assigned to the container is located inside the shielded receiving compartment, the antenna device likewise provided in the shielded region can advantageously be used for communication with this transponder. It is however also possible to provide the transponder of the container outside the shielded region and use an external REID antenna device for identification of the container. Finally, the transponder of the container can also be arranged so that its identification can be made both with an external antenna device located inside the shield receiving compartment and also an external antenna device. This is achieved, for example, with an arrangement of the transponder in a "recessed area" of an otherwise flat extensive shielding.

Alternatively or additionally to a transponder which characterizes the container itself, the container can be provided with a plurality of transponders distributed in the receiving compartment. This particularly offers advantages in connection with a container configuration in which the articles are accommodated in predefined receiving positions in the container. Transponders arranged in individual receiving positions according to such a division of the receiving compartment can be used, for example, to detect the occupancy of the individual receiving positions. Then, with such an RFID system, in addition to identifying the accommodated article, the position in the accommodating compartment can also be detected for that identified article. According to one variant of this concept, it is provided that for each predefined receiving position, a transponder is provided in the accommodating compartment which in the case of an accommodated article in the relevant position is shielded by this article from the radio engineering point of view.

In one embodiment the articles to be received are electrical or electronic appliances.

Such appliances can be connected electrically to one another, for example, inside the container (e.g. for power supply and/or for data exchange).

The articles to be accommodated can, for example, be IT (information technology) appliances, for example, network components such as so-called blades, switches, routers, patch panels etc. or telecommunications equipment or electrical components for building installation (e.g. controllers, transformers, fuses, consumption meters, distribution panels, solar power plant components etc.)

Such devices for use in information technology, telecommunications technology and/or electrical installation engineering for buildings are usually accommodated and wired in special racks or receiving cabinets (e.g. switchgear cabinets for electrical installation engineering). Racks and cabinets can be achieved according to the invention by means of a rather slight and therefore simple modification. Thus, for example, an inventory relating to the appliances provided in an organization can be taken in an advantageously simple and reliable manner.

In one embodiment, at least a part of the RFID antenna device is simultaneously formed, for example, by a supporting element of a mechanical container structure. For example, an elongate strut or a flat extended side part (e.g. side wall or bottom wall or top wall) can be formed and used as an RFID antenna.

The antenna device can, for example, comprise a rod antenna or a flat extended antenna ("patch antenna").

In the case of a substantially rectangular container, lateral, upper and lower wall sections of a mechanical container structure can advantageously be used as patch antennae.

Coil windings integrated in (let into) a container wall can also function as antenna (for an inductive coupling to the transponder).

In one embodiment, the RFID antenna device comprises a plurality of antennae. Such a plurality of antennae can be operated simultaneously or, for example, operated simultaneously or sequentially via a suitable multiplex device.

In one embodiment it is provided that the container and/or an article further comprises a sensor device.

The sensor device can in particular comprise a sensor for detecting at least one physical quantity in the receiving compartment. An air humidity, a temperature, a gas concentration etc. can be considered, for example, as physical quantities. Such quantities including their time evolution can be of major importance particularly when the container is used for storage and/or for transporting the articles contained therein. The specific type of appropriate sensors is deduced ultimately from the type of articles concerned.

Within the scope of the invention, detection results of the sensor device can be transmitted, for example, via the electrical connection device already mentioned above to an external device. In this case, for example, a plug connection can be provided via which both the antenna device is operated and the sensor data transmitted.

In the case of a transport container (e.g. sea freight container), for example, an "electronic seal" can be provided as such an external device to which sensor data are transmitted. The latter can be provided, for example, primarily to detect and store any opening and closing or corresponding times for this. Within the scope of the invention, however, an additional storage of sensor data (e.g. temperature, shock, vibration etc) is particularly interesting. Within the scope of the invention, such an electronic seal can additionally have the function of the "RFID reader".

It is also feasible that the articles to be accommodated themselves or their transponders have a sensor device for detecting physical quantities. In this case, the sensor data can be detected simultaneously with the identification of the individual transponders by the RFID reader.

A particularly preferred use of the RFID system or method according to the invention is the automatic identification of goods or articles, in particular, for example, in the field of procurement and distribution logistics, in trade, in production operations or other material flow systems.

The invention can advantageously be integrated in conveying technology in the field of production and/or logistics and can be used in specially adapted variants (e.g. also in transport).

A further particularly preferred use of the invention is obtained in the field of automotive engineering. In the RFID system according to the invention, the container can, for example, be a mechanical structure, in particular a chassis of a vehicle, wherein the articles to be accommodated therein are formed by vehicle components which are installed in the vehicle. For example, with an RFID system of this type, it is possible to detect components in the engine compartment of an automobile (e.g. brake shoes, alternator, hydraulic pump, air filter, hoses etc.).

In a further development it is provided that the reader for identifying the vehicle components installed in the vehicle constitutes part of vehicle electronics provided in any case (data readout e.g. by workshop staff).

An RFID system according to the invention comprises at least one container of the type explained previously and at least one reader for identifying the transponder located in the container. In a further development of the RFID system this is incorporated in a network of a data processing device.

BRIEF DESCRIPTION OF THE DRAWINGS

The invention is further explained hereinafter by means of exemplary embodiments with reference to the appended drawings. In each case, in the schematic figures.

DESCRIPTION OF THE PREFERRED EMBODIMENT(S)

Figure 1:
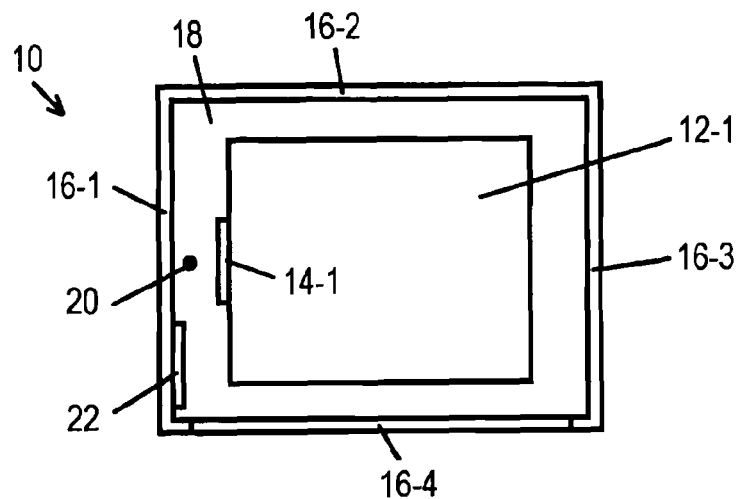
FIG. 1 shows a plan view of a server rack according to a first exemplary embodiment.
Figure 2:
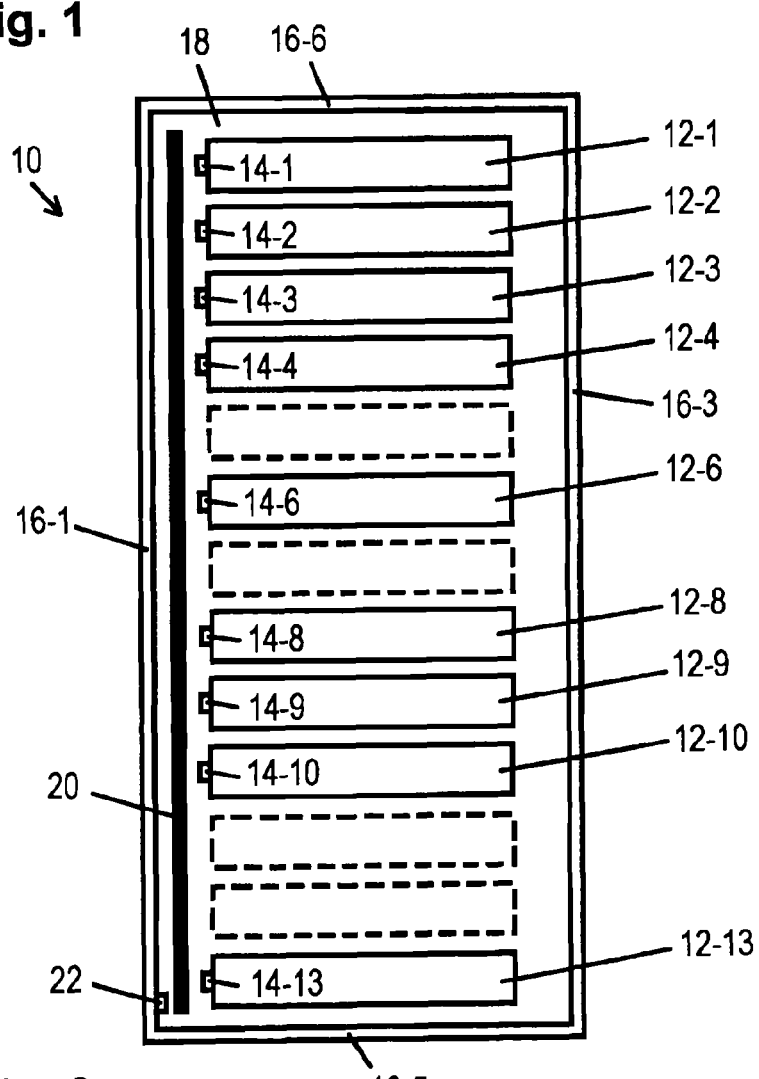
FIG. 2 shows a front view of the server rack.

FIGS. 1 and 2 show a plan view of a front view of a container 10 in the form of a so-called "server rack" for accommodating articles 12-1 to 12-13 in the form of IT components (e.g. patch panels, blades, switches etc.).

The reference numerals of multiply provided components but having a similar effect such as, for example, the articles which can be seen in FIGS. 1 and 2 are continuously numbered (in each case supplemented by a hyphen and a continuous number). Reference is made hereinafter to individual such components or to the entirety of such component by means of the non-supplemented reference numeral.

The articles 12 are in each case provided with an RFID transponder 14 ("RFID tag") in which article-specific data such as, for example, the type of article, a serial number, an inventory number etc. are stored and can be read out by means of RFID (and optionally also modified).

The container 10 has a mechanical container structure consisting of an outer housing structure and an inner supporting structure.

In the example shown, the housing structure substantially consists of metal walls 16-1 to 16-6 which define a receiving compartment 18 for accommodating the articles 12 (in the example shown, completely enclose them). The front wall 16-4 is configured as a swing-open door to create access to the receiving compartment 18. For the sake of clarity of the diagram in FIG. 1 an upper-side wall 16-6 is omitted and in FIG. 2 the front wall (door) 16-4 is omitted.

After opening the door or wall 16-4, articles 12 can be placed into or removed from the container 10.

For simplicity of the diagram, the inner supporting structure of the container 10 is not shown in detail. It is used for mechanical stabilization of the entire structure and possesses retaining means or forms such retaining means which allow secure fastening of the articles 12 accommodated in the container 10 (e.g. by means of a screw connection).

If the articles 12 are electrical or electronic appliances, as is the case in the example shown, the inner supporting structure of the container 10 can advantageously also provide electrical conducting and/or contact means which simplify a power supply and/or electrical connection of the appliances to one another.

In FIG. 2 four areas of the receiving compartment 18 not currently in use are indicated by the dashed lines as an example.

Containers such as the server rack 10 show are used in many computer departments of companies. As a result of more or less frequent changes in the computer structure, the content of each container is subject to continuous change. Many organizations and companies therefore rapidly lose the overview relating to the presence and actual use (installation site) of their computer components. This gives rise to high costs for the rapid provision of components currently required and/or an increased expenditure on staff for regular stocktaking and updating inventory listings.

Although the RFID technique known as such in principle allows automatic data acquisition of articles provided with transponders, the use of this technique for identifying articles provided with RFID transponders and accommodated in containers of the type shown in FIGS. 1 and 2 failed hitherto because of the shielding effect of the metal container construction in which the articles to be detected together with transponders are located.

In the container 10 shown, however, this problem is eliminated in a simple manner so that the transponder 14 located in the container can be reliably identified by means of the RFID technique.

An essential feature of the container 10 for this purpose is that an RFID antenna 20 for communication with the transponders 14 is located in the receiving area 18. The antenna 20 is connected in a suitable manner (not shown) to an RFID reader which can be located inside the container 10 or also (preferably) outside the container 10.

As a result of the arrangement of the antenna 20 inside the metal housing structure, this structure does not impair the radio engineering communication between antenna 20 and transponders 14.

In the exemplary embodiment shown, the disadvantageous shielding effect of a metal housing structure in the prior art is transformed into a number of major advantages. In particular, this shielding reduces the risk of impairments of the communication by external interference sources. In addition, the shielding makes it possible to operate an RFID system with several containers 10 parallel and in the spatial vicinity without the communications taking place in the individual containers having a mutual adverse effect. A unique allocation of the detected objects is therefore possible, which had not been possible in the case of general three-dimensional detection as practiced hitherto in the prior art. This therefore solves a basic problem of RFID compared to the barcode, for example, where a "visual contact" with an individual object exists at the time of data acquisition, whereas in the case of an RFID "radio detection", as in public radio communications, all subscribers (tags) listen in and can "answer without being addressed". In the prior art this presents major problems for the unique assignment of objects in reality.

As a result of the relative short distance between the antenna 20 and the transponders 14, all the components of the RFID system can be configured to be simpler than was hitherto usual (for long-range detection). The antenna 20 shown, for example, comprises a rod antenna by which means very simple short-range data acquisition is achieved.

In a preferred embodiment, an antenna is formed by an element of the mechanical container structure otherwise provided. This optionally requires a slight modification of the element concerned such as, for example, electrical insulation from other metallic container sections. The antenna 20 shown in FIG. 2 can, for example, at the same time form a reinforcing strut of the internal supporting structure of the container 10. In other words, such a reinforcing strut, optionally after slight modification, can be used as an antenna. It is therefore not absolutely essential that an antenna is manufactured separately as an "additional component" and installed subsequently in the container in order to achieve the RFID method described.

Similarly to the article 12, the container 10 itself is also provided with am RFID transponder 22. The transponder 22 holds RFID-readable data relating to the container 10 in readiness (e.g. container type, receiving compartment capacity, inventory number etc.) and is located inside the shielded receiving compartment 18 in the exemplary embodiment shown. Thus, the data stored in the transponder 22 can be read or written by means of a communication using the antenna 20. Alternatively, the transponder 22 could, for example, be integrated in one of the walls 16 in such a manner that communication is possible both with the internal antenna 20 and also with an external antenna (not shown).

In the following description of further exemplary embodiments, the same reference numerals are used for components having the same action, in each case supplemented by a small letter to distinguish the embodiment. In this case, substantially only the differences from the exemplary embodiment or embodiments already described are discussed and otherwise reference is herewith expressly made to the description of previous exemplary embodiments.

Figure 3:
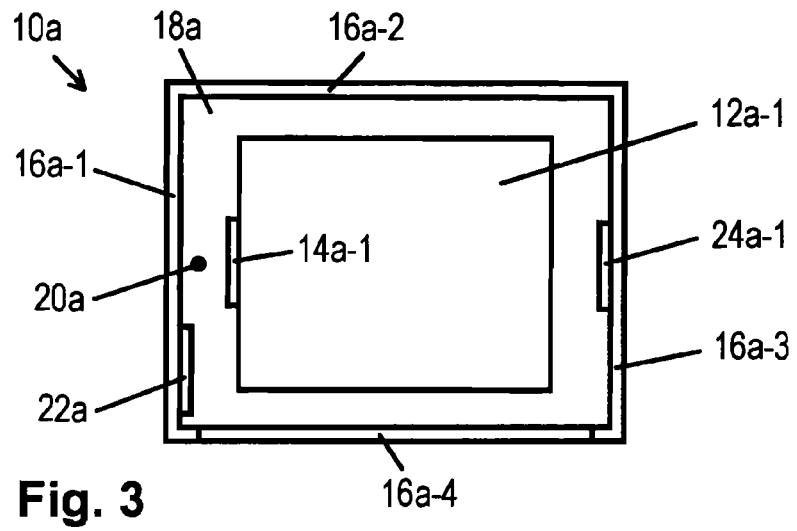
FIG. 3 shows a plan view of a server rack according to a further exemplary embodiment.
Figure 4:
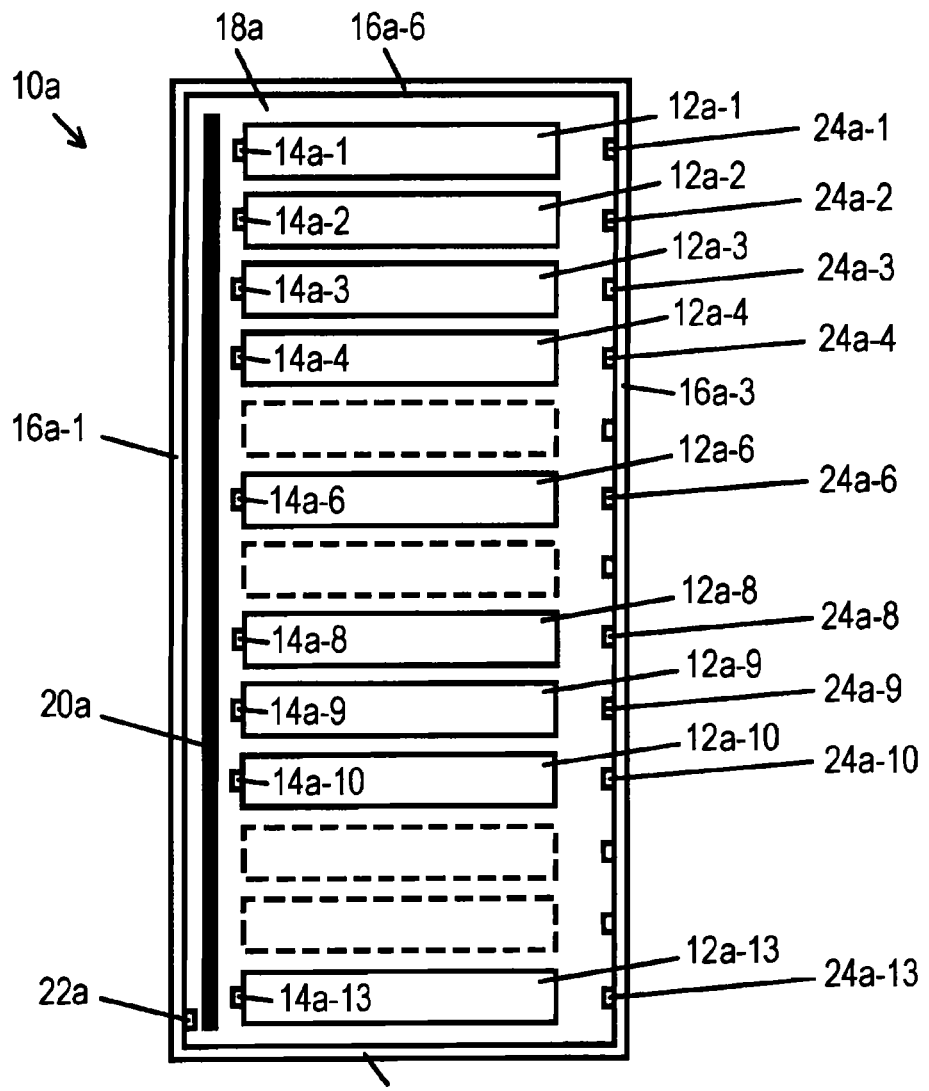
FIG. 4 shows a front view of the server rack.

FIGS. 3 and 4 illustrate a container 10a according to a further exemplary embodiment.

The container 10a and its function within an RFID system substantially correspond to the example from FIGS. 1 and 2 described above.

A particular feature of the container 10a, however, is that the retaining means of the inner supporting structure provide fixedly predefined receiving positions for the articles 12a to be accommodated as desired in the receiving compartment 18a and that respective further transponders 24a-1 to 24a-13 allocated to each of these receiving positions are disposed in the receiving compartment 18a. The transponders 24a are each disposed on the inner side of the right-hand housing wall 16a-3 at a height corresponding to the relevant receiving position. Since the antenna 20a is disposed adjacent to another housing wall (here: on the opposite, i.e. left-hand housing wall 16a-1), any article 12a accommodated in a specified receiving position impedes direct communication between the antenna 20a and the transponder 24a corresponding to the receiving position. This is because a metal housing structure of the articles 12 provided here (as electronic IT components) possesses a shielding effect for this communication. With a suitable configuration of the shielding effect and the RFID technique (in particular, for example, radiation power of the antenna 20a and the transponder 24a), this effect can be used to detect "empty receiving positions" inside the receiving compartment 18a.

In FIG. 4 four such unoccupied receiving positions are shown as an example by the dashed lines. A particularly good communications link can be set up between the transponders 24a-5, 24a-7, 24a-11 and 24a-12 assigned to these positions on the one hand and the antenna 20a on the other hand, whereas the communication between the other transponders 24a and the antenna 20a is substantially inferior or not possible at all. This difference can easily be determined by means of the RFID reader used and used to detect the unoccupied receiving positions and the occupied receiving positions.

In the example shown it is not provided to detect the exact positions of the articles 12a located in the receiving compartment 18a. This could however be achieved, for example, by using a corresponding plurality of individual antennas (one for each receiving position to be detected) instead of the rod antenna 20a extending continuously over all receiving positions.

Figure 5:
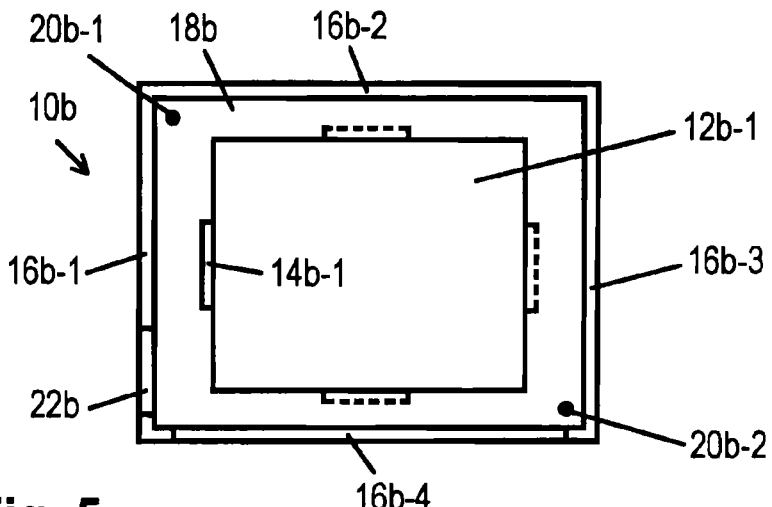
FIG. 5 shows a plan view of a server rack according to a further exemplary embodiment.
Figure 6:
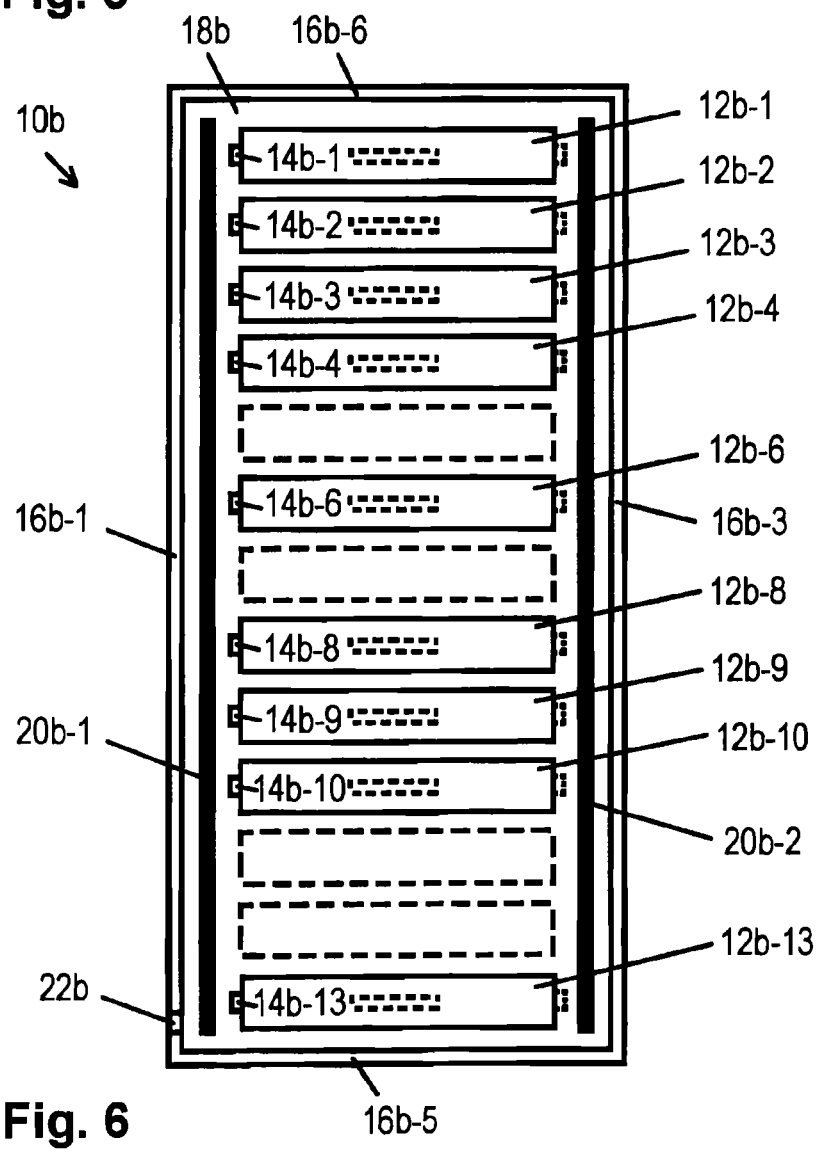
FIG. 6 shows a front view of the server rack.

FIGS. 5 and 6 illustrate some possible modifications of the server racks 10 and 10a described so far, i.e., with regard to the specific arrangement of an RFID antenna device in the interior of the container and the RFID transponder at the articles to be accommodated.

In the container 10b shown the RFID antenna device comprises two antennas 20b-1 and 20b-2 which, when viewed from above are located in mutually opposite edge zones of the receiving compartment 18b. In particular, for a relative short "reading range" (e.g. a few cm), the reliability of the communication can be improved by such an arrangement of a plurality of antennas. Furthermore, a greater freedom of design is obtained in regard to the arrangement of transponders 14b on the individual articles 12b. Alternative positions for the transponders 14b assigned to the articles 12b are indicated by the dashed lines in FIGS. 5 and 6.

Particularly when using a plurality of antennas such as, for example, in the container 10b, the precise arrangement of the transponders 22b is not critical. This arrangement of the transponders 22b need not be fixedly predefined but can also vary from one article to another (cf. transponder positions depicted by the dashed lines).

In addition, in the container 10a an aforementioned arrangement of the transponders 22b characterizing the container 10b itself is selected in such a manner that a connection can be made to this transponder starting from an external RFID antenna.

Figure 7:
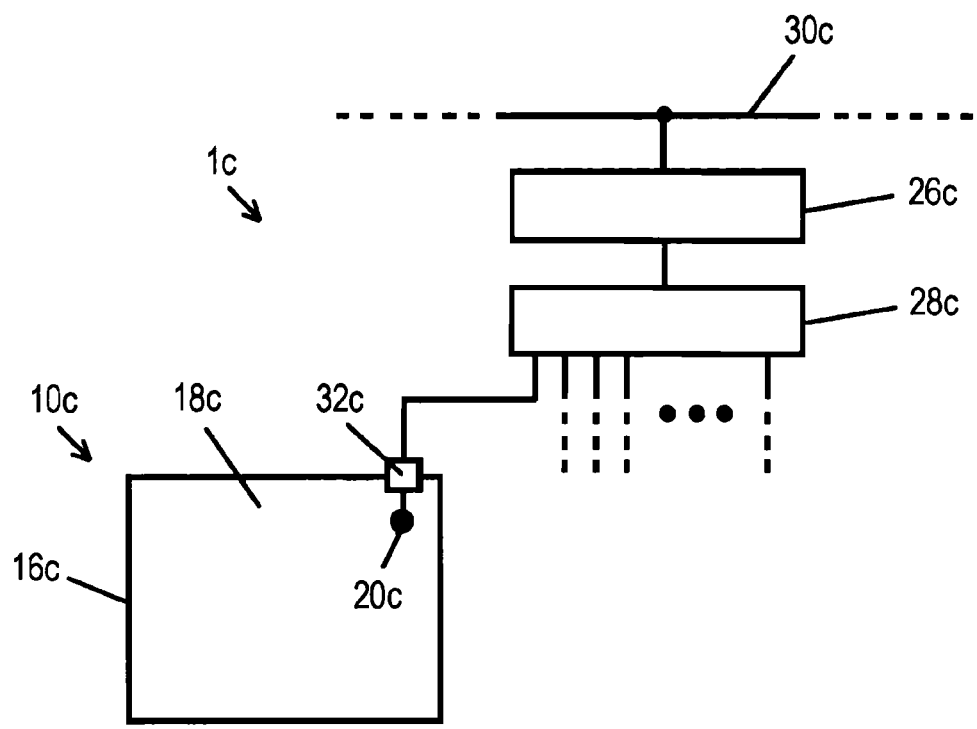
FIG. 7 shows a connecting configuration for connection of a plurality of containers to a common RFID reader.

FIG. 7 illustrates a connecting configuration of an RFID system 1c in which the content of a plurality of containers can be identified with a reader 26c. One of these containers is depicted in the figure and designated by 10c. This container can, for example, be a container of the type which has already been described above with reference to FIGS. 1 to 6.

For this purpose, the reader 26c is connected via a conducting connection to a multiplex device 28c, which in turn is connected electrically via a plurality of conducting connections to the individual containers like the container 10c.

A time multiplex method, for example, can be accomplished with the configuration shown, in which the antennas of the containers connected thereto can be operated temporally successively for RFID communication. In the configuration shown, the data determined by the reader 26c relating to the content of the individual containers and optionally relating to the containers themselves are relayed to a computer bus system 30c (network) to which the reader 26c is connected.

The reader 26c and the multiplex device 28c could also be combined structurally to produce a reader which, in a multiplex method, is capable of operating a plurality of RFID antennas connected via a conducting connection.

The reference numeral 32c designates an electrical connecting device (e.g. plug socket) which, passing through a wall of the housing structure 16c, allows contact with the antenna 20c disposed in the interior of the container 10c. This connecting device 32c can comprise a "composite device" which not only serves for connection of the RFID antenna(s) but also for electrical contacting of any other components of the container 10c. If the container 10c is, for example, provided for accommodating articles in the form of electrical or electronic appliances, these appliances can also be contacted via the connecting device 32c (e.g. for connection to an electrical power supply network and/or to a data transmission network).

Figure 8:
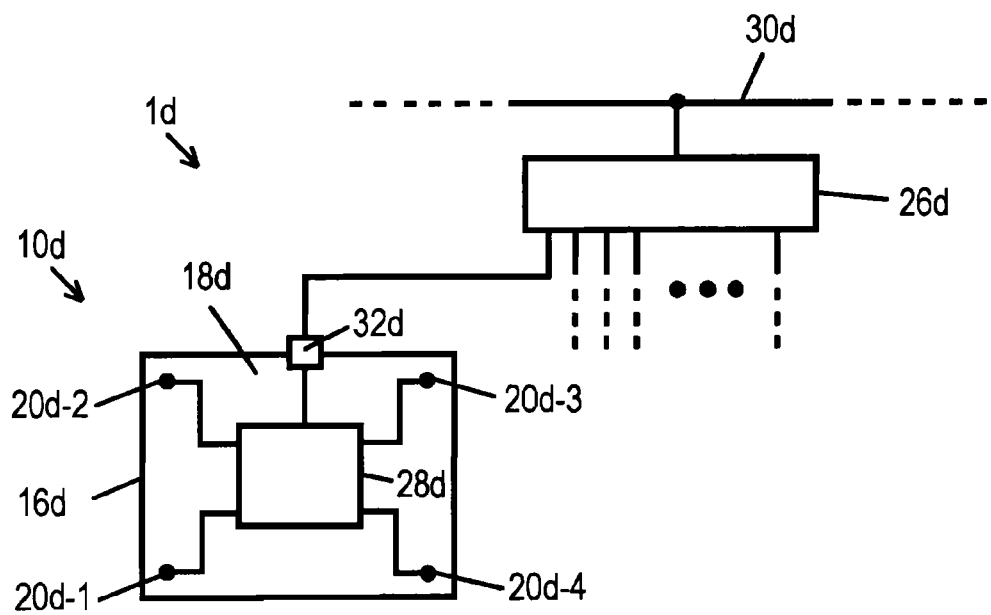
FIG. 8 shows a connecting configuration for connection of containers provided with a plurality of antennae to an RFID reader.

FIG. 8 shows a modification of the configuration described with reference to FIG. 7 in which a reader 26d with connection facilities for a plurality of antennas is used.

Respectively one antenna can be connected to the individual connections of the multiple reader 26d. In a container 10d depicted in FIG. 8, four antennas 20d-1 to 20d-4 are provided in the receiving compartment 18d, which however are not connected individually to the reader 26d via a conducting line but are connected to a multiplex device 28d which is integrated on or in the container 10d. The multiplex device 28d is in turn connected to the reader 26d.

An electrical connecting device 32d like the aforementioned connecting device 32c (FIG. 7) is preferably configured as an electrical plug connection device.

Figure 9:
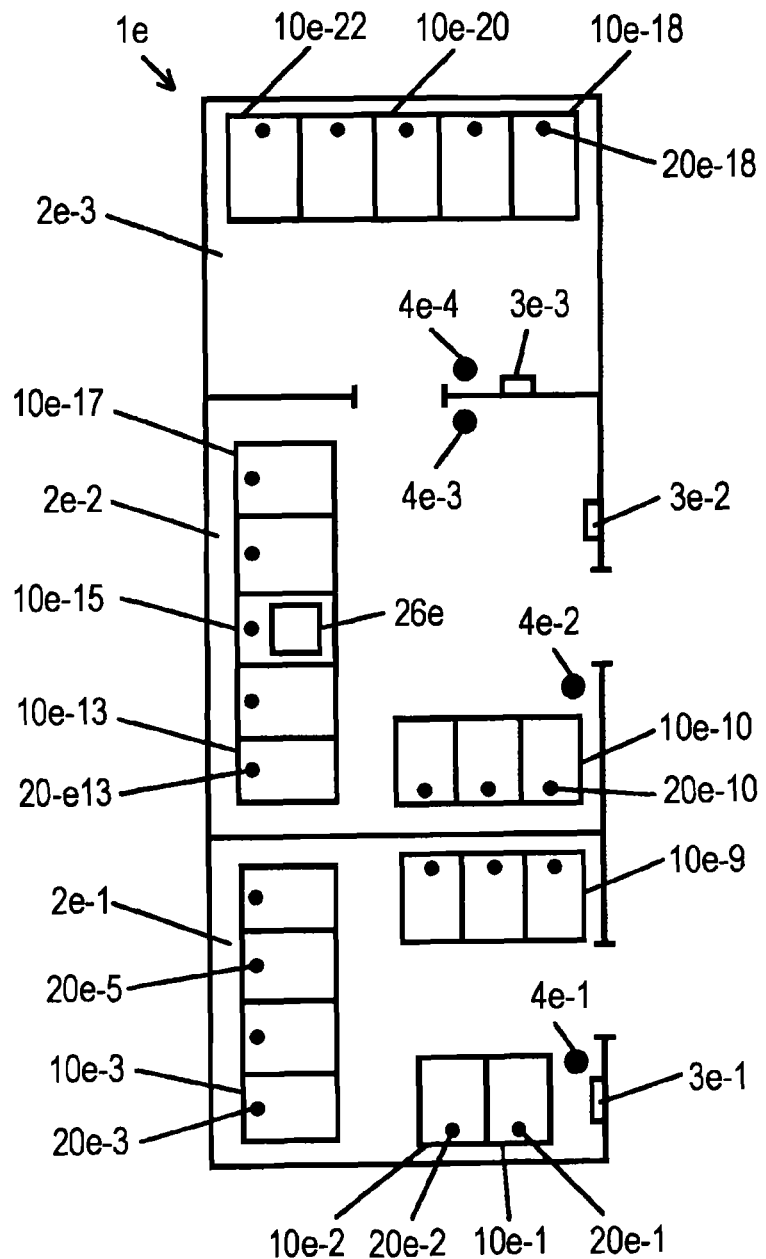
FIG. 9 shows an RFID system for continuous detector of an inventory of a computer department in a company.

FIG. 9 illustrates an RFID system 1e for the automatic detection of the IT inventory in computer rooms 2e-1, 2e-2, and 2e-3 of a company.

Each of the rooms 2e is provided with a transponder 3e-1, 3e-2 or 3e-3 characterizing the respective room. Furthermore, a plurality of RFID antennas 4e-1 to 4e-4 are distributed over the rooms 2e, which are connected in a manner not shown in detail to a central RFID reader 26e and can communicate, for example, with the said transponders 3e01 to 3e-3.

Distributed in the rooms is a plurality of computer cabinets 10e-1 to 10e-18, which accommodate the IT components of a larger computer system. The individual containers 10e can, for example, each be configured as already described above with reference to FIGS. 1 to 8. In particular, in each case at least one RFID antenna 20e is disposed in a receiving compartment of each of the containers 10e in order to communicate in the manner already described above with those transponders which are attached on or in the articles (IT components) located in the containers 10e.

For the sake of the simplicity of the diagram, the connection between the individual antennas 20e-1 to 20e-18 and the further antennas 4e-1 to 4e-4 on the one hand and the central reader 26e on the other hand is not shown. Particularly against the background of the previous description it is clear that there are numerous possibilities for this in practice. For example, one or more multiplex devices can be provided to connect the plurality of antennas to the reader 26e, wherein these multiplex devices can be located inside or outside the containers 10e. For example, it can be provided that in each of the three rooms 2e-1 to 2e-3 one separately located multiplex device is connected to the respective antennas (in each case of one room) and this multiplex device is in each case connected to the reader 26e via a fixed cabling system in the building.

In the configuration shown, it is expedient to attach optionally provided transponders, which characterize the individual containers 10e, to the individual containers 10e in such a manner that these can be detected by the respective room antennas 4e. By means of these antennas 4e it can thus be detected how many and which containers are located in each of the rooms. The antennas 20e located inside the containers 10e are used to detect the individual contents of the containers 10e. In addition, the external antennas 4e-1 to 4e-2 can additionally be used to detect changes in location of individual articles (IT components) and individual containers during operation of the RFID system 1e.

Figure 10:
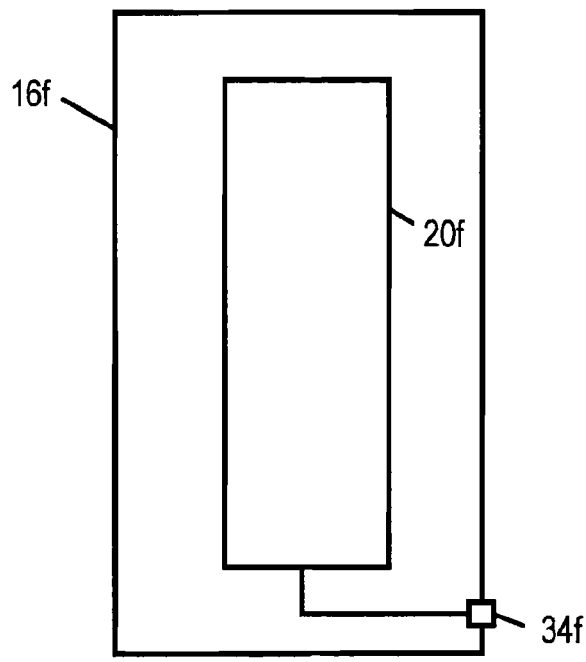
FIG. 10 shows a container wall modified to form a patch antenna.
Figure 11:
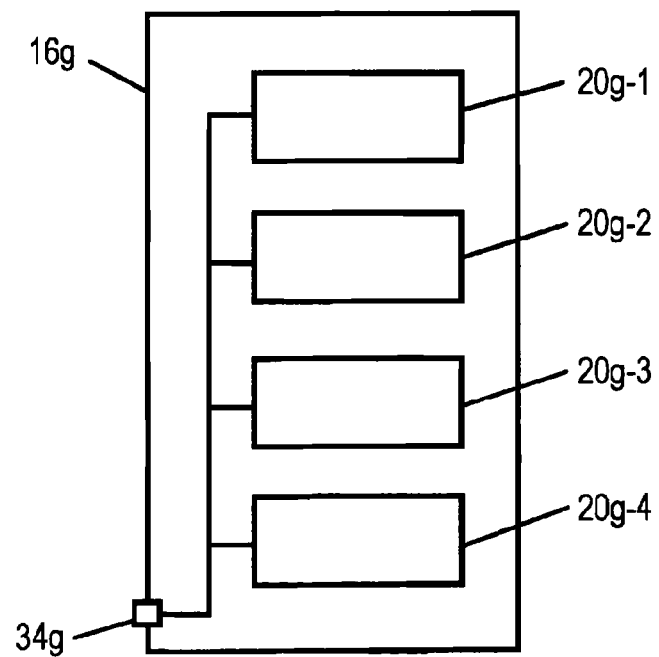
FIG. 11 shows a container wall modified to form a plurality of patch antennae.

FIGS. 10 and 11 illustrate as examples the integration of flat extensive so-called patch antennas in side walls provided for the construction of containers according to the invention.

FIG. 10 shows a side wall 16f with a patch antenna 20f integrated in the middle region thereof.

FIG. 11 shows a wall 16g with patch antennas 20g-1 to 20g-4 integrated thereon or therein.

The antennas 20f or 20g-1 to 20g-4 shown are each connected to an electrical connecting device 34f or 34g by means of an electrical conducting arrangement likewise integrated in the wall 16f or 16g. This connecting device can be used, for example, for further contacting (possibly to other container components) or for external wiring of the container.

In the example illustrated in FIG. 11, the antennas 20g-1 to 20g-4 are operated simultaneously. In contrast to this, it is also possible to insert a multiplex device of the type already explained above between the connecting device 34g on the one hand and the four antennas 20g-1 to 20g-4 on the other hand, or to run a separate line to the connecting device for each of the four antennas.

The walls 16f and 16g shown in FIGS. 10 and 11 can be used, for example, as replacement for a suitably sized wall of a conventional container in order to modify this container according to the present invention.

Exemplary embodiments of RFID containers and RFID systems have been described hitherto which comprise one or more containers of the type explained. Subsequently some examples are described with reference to FIGS. 12 to 14 which are particularly dedicated to the aspect of the RFID technique for identifying the contents of a plurality of containers.

Figure 12:
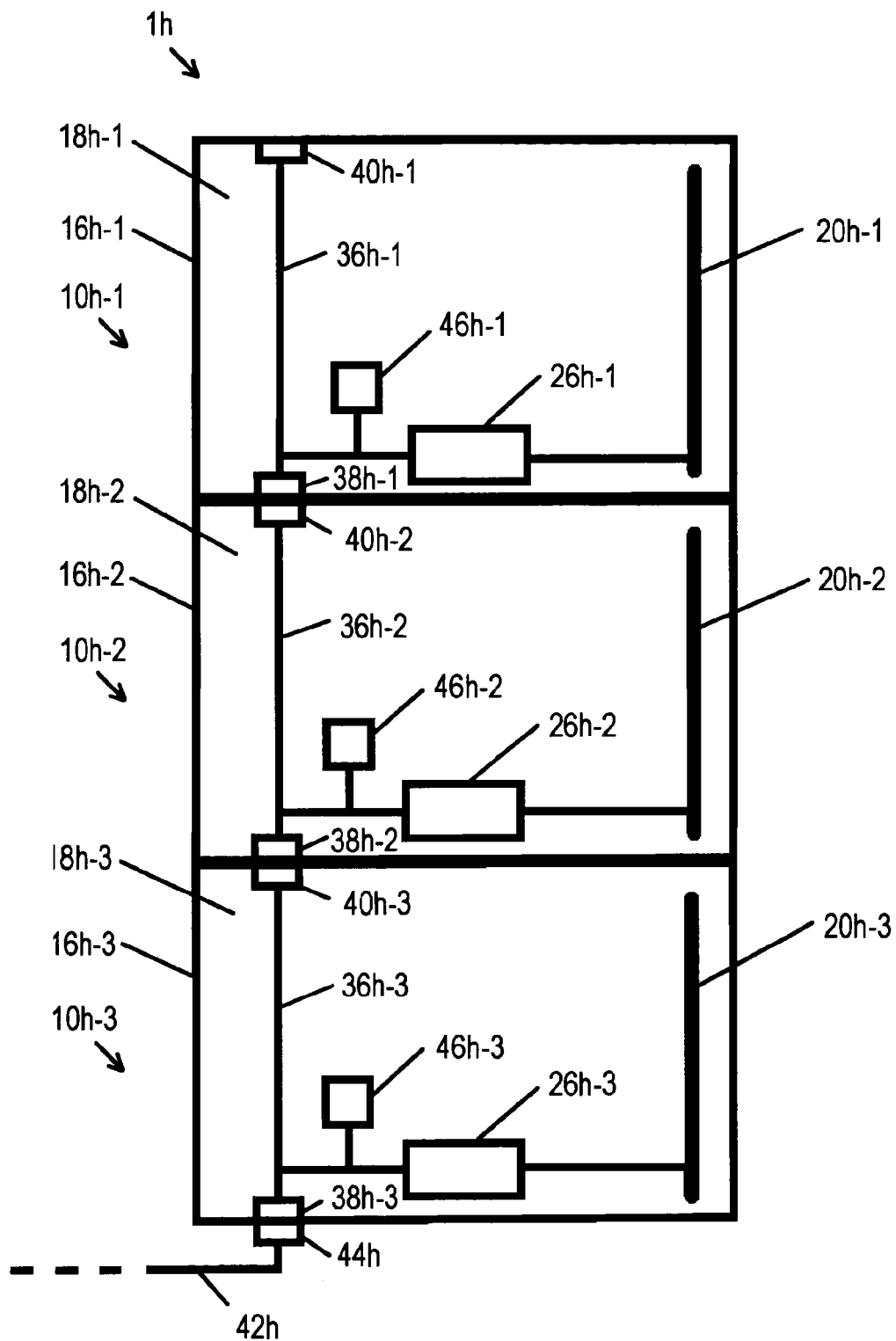
FIG. 12 shows an RFID system for stacked containers.

FIG. 12 illustrates essential components of an RFID system 1h comprising a plurality (here, for example, 3) of containers 10h-1, 10h-2 and 10h-3, the contents whereof are to be detected by the system. As in the examples already described above, the containers 10h are each provided for receiving articles as desired, which are provided with suitable RFID transponders. To simplify the diagram these articles and their transponders are not shown in FIG. 12.

A first particular feature of the containers 10h is that these have an external mechanical housing structure 6h which allows (vertical) stacking and/or a (horizontal) arrangement of a plurality of several containers 10h. As an example, FIG. 12 shows a stack of three containers of the same type 10h-1, 10h-2, and 10h-3.

Another particular feature of the containers 10h is that electrical contacting of the containers with one another to form an electrical conducting arrangement extending along the entire stack or along the entire arrangement in rows is only effected by the stacking and/or arrangement of the containers in rows.

In the example shown, this conducting arrangement consists of conducting sections 36h-1, 36h-2 and 36h-e each running inside the container 10h.

Since the three containers 10h are configured identically in this example, only the lowest container 10h-3 in FIG. 12 is described in detail subsequently.

The conducting section 36h-3 provided in the container 10h-3 runs, starting from a plug connection device 38h-3 on one side (here: underside) of the container 10h-3 to a counter plug connection device 40h-3 on the opposite side (here: upper side) of the container 10h-3. The devices 38h-3 and 40h-3 are configured to correspond to one another, possibly as an electrical plug and matching socket. It is therefore clear that a continuous conducting arrangement is formed in the stack direction by stacking a plurality of such containers. The running direction of the conducting section 36h corresponds in this case to the stack direction provided (vertical). Unlike the example shown, the conducting section could also run, for example, horizontally corresponding to a horizontal arrangement in a row. Finally a plurality of conducting sections running in different directions (corresponding to a plurality of different possible stacking directions) could also be provided in each of the containers 10h.

In the example shown, the conducting sections 36h form a data transmission bus, for example, of a common standard in the field of computer technology. For connection of this bus to a computer or a computer network, a corresponding data transmission cable (network cable) 42h is connected to one of the plug connection devices and counter plug connection devices, which cable is provided at its end with a suitable counter plug connection device or plug connection device 44h. Since in the example shown, the data transmission cable 38h-3 with the device 44h is contacted on the underside of the container 10h-3 with the plug connection device 38h-3, this device 44h must be configured in precisely the same way as the counter plug connection devices 40h.

The RFID method for identifying the transponders located in the containers 10h takes place, as already described above for the other examples, with the aid of the RFID antennas 20h-1, 20-h2 and 20h-3 located in the respective receiving compartments 18h-1, 18h-2 and 18h-3.

The antennas 20 are each connected to a RFID reader 26h-1, 26h-2 or 36h-3 located in the interior of the relevant container 10h, which accomplishes the communication between the antennas and the transponders and is connected to the relevant conducting section 36h of the data transmission bus in order to exchange read data and optionally write data with the computer network.

Unlike the exemplary embodiment shown, a common reader located externally from the stack can also be provided for joint operation of all the antennas 20h. In this case, the conducting sections 36h could be configured, for example, as HF conducting sections. In practice, however, such a modification has the problem that as a result of the unknown stack height or number of stacked or successively arranged container 10h, the HF technical matching of the individual antennas presents difficulties.

In the embodiment shown in FIG. 12 with readers integrated in the containers 26h, the power supply to these readers is preferably also provided with the aid of the electrical conducting connection formed by stacking or successively arranging the containers 10h which can have individual power supply lines for this purpose in addition to the lines provided for the data transmission.

Another particular feature, which can be advantageously used in all the RFID containers described here will be explained by reference to the example from FIG. 12. This comprises the integration of a sensor device in the area of the container.

Each of the containers 10h is further provided with a sensor device 46h located inside the receiving compartment 18h. The power supply as well as the relaying of sensor data is accomplished as for the readers 26h by connecting each of the sensor devices 46h to the data transmission bus. Unlike the configuration symbolized in FIG. 12, the sensor devices 46a could also be provided structurally combined with the readers 26h.

The purpose of the sensor devices 46h is to detect physical quantities of interest according to the case of application, in particular quantities measured in the receiving compartment 18h (e.g. temperature, air pressure, humidity, shaking, vibrations etc.). For this purpose the sensor devices 46*h* can be fitted with corresponding sensors or connected to such sensors.

The detection of ambient conditions to which the articles are exposed, which is made possible in parallel to the identification of transponders and therefore the contents of individual containers 10*h* is particularly advantageous in the area of the storage and/or transport of goods. If the containers 10*h* are used as freight containers, for example, as is usual for example in international goods traffic, not only can the insertion, the removal, and the current inventory of goods be selectively detected or monitored for each individual container by means of the RFID system but a continuous monitoring of the articles stored and/or transported in the containers can also take place. Thus, not only an automatic and operator-free and therefore simple inventory and updating of inventory data is possible but also effective monitoring with regard to harmful ambient conditions during storage and/or transport.

In a further development it can be provided that the containers 10*h* are each equipped with an electronic memory device for the intermediate storage of RFID read or write data and/or sensor data in order to bridge "time monitoring gaps" in the case of a non-continuously conducted RFID method. In the example in FIG. 12, such a memory device could be disposed, for example, between the line sections 36*h* on the one hand the readers 26*h* and sensor devices 46*h* on the other hand or they can be provided integrated in one or both of the latter devices.

Figure 13:
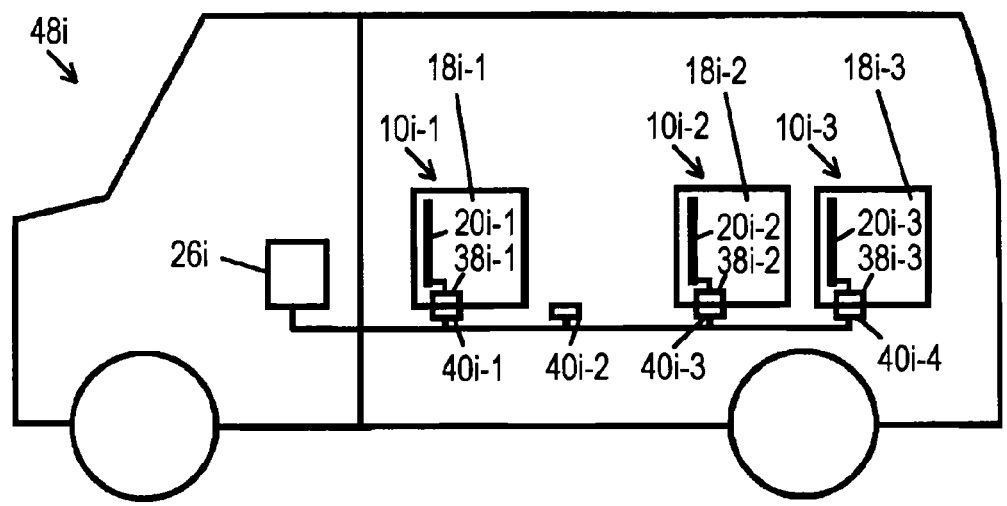
FIG. 13 shows a vehicle fitted with an RFID system according to one exemplary embodiment.

FIG. 13 illustrates a use of RFID containers 10*i* as transport containers which can be located in dedicated receiving areas on board a vehicle. FIG. 13 illustrates this for the example of a motor vehicle 48*i* having four loading bays provided in its loading area for accommodating four containers 10*i* adapted with regard to their external housing structure.

In FIG. 13 three such containers 10*i*-1, 10*i*-2 and 10*i*-3 are actually accommodated in the loading area of the vehicle 48*i*. Similarly to example in FIG. 12, automatic electrical contacting of the relevant containers 10*i* is achieved through the arrangement of each container 10*i*. For this purpose the containers are each equipped at a provided point (in this case: on their underside) with an electrical plug connection device 38*i* which makes an electrical contact with a vehicle-side counter plug connection device 40*i* in the disposed state of the container.

In the example shown, the connecting devices 38*i* and 40*i* are used to make an HF connection between a jointly used RFID reader 26*i* and the RFID antennas 20*i* located in the respective receiving compartment 18*i* of the containers 10*i*.

Figure 14:
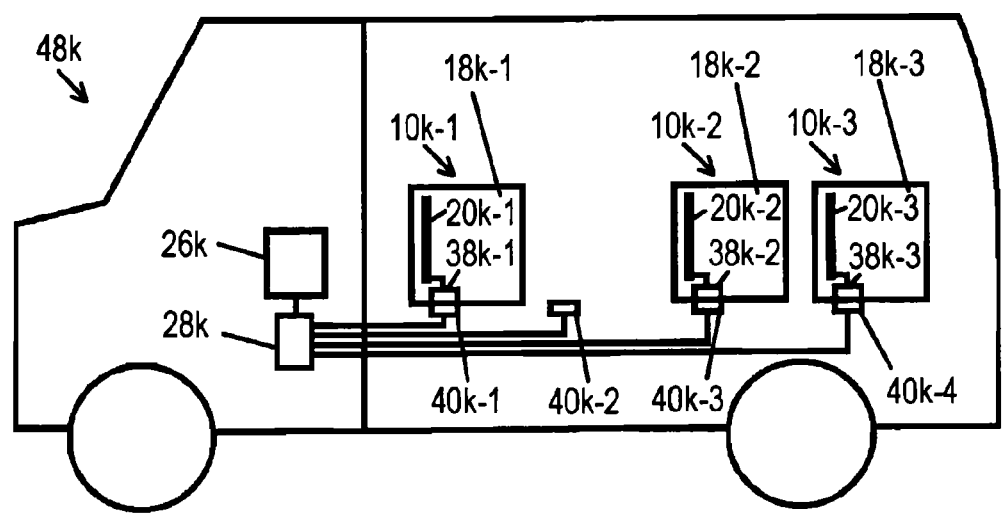
FIG. 14 shows a vehicle according to a further exemplary embodiment and FIG. 15 shows a vehicle according to a further exemplary embodiment.

FIG. 14 shows a vehicle 48*k*, which is slightly modified compared with the vehicle 48*i* described with reference to FIG. 13.

In the vehicle 48*k* a vehicle-side reader 26*k* provided for RFID detection at containers 10*k* is connected to a multiplex device 28*k*, from which separate electrical connecting lines run to each individual one of the counter plug connection devices 40*k*-1 to 40*k*-4.

Figure 15:
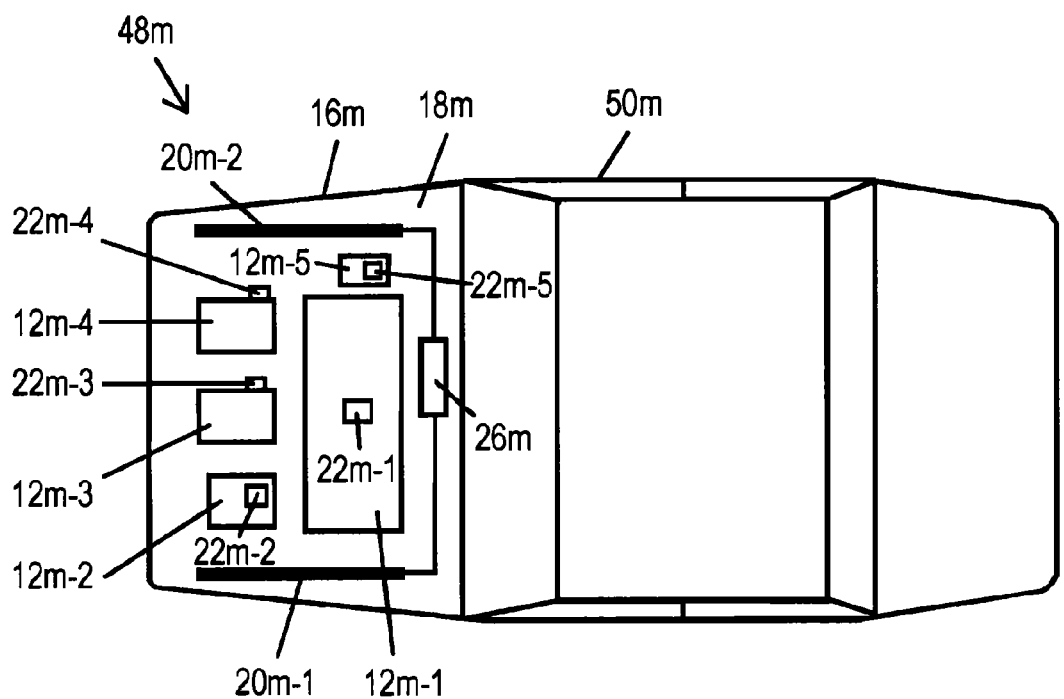

FIG. 15 is a schematic plan view of a motor vehicle 48*m* having a bodywork 50*m*, of which front bodywork wall areas 16*m* (e.g. fender, fan grill, engine hood etc.) more or less surround an engine compartment 18*m*. A plurality of vehicle components are fixedly installed in the engine compartment 18*m* in a manner known per se, in particular an engine block 12*m*-1 shown schematically in the figure and other engine components 12*m*-2 to 12*m*-5. These components accommodated in the area 18*m* comprise, for example, auxiliary equipment of the engine 12*m*-1 (e.g. coolant pump, alternator etc.).

An RFID system is integrated in the vehicle 48*m*, of which an RFID reader 26*m* and antennas 20*m*-1 and 20*m*-2 connected thereto via lines are indicated in the figure. Thus, articles built into the engine compartment 18*m* and each provided with an RFID transponder 22*m* can be simply and reliably identified. The RFID tags on or in the individual vehicle components and other built-in components can replace the barcode labels which are usual today. Unlike in the case of components provided with a barcode, components each provided with an RFID transponder can easily be detected in the built-in state, checked (e.g. for production batch numbers, model numbers, authenticity etc.) or an inventory taken.

As far as the configuration of the antennas 20*m* of the RFID system shown in FIG. 15 is concerned, all the previously and subsequently described structures can be used. In the exemplary embodiment shown, for example, rod antennas or patch antennas could be used, these being disposed, for example, on the inner side of metal bodywork parts (e.g. fender etc.)

In a further development it is provided that the reader 26*m* is connected to an on-board electronics system (e.g. comprising an on-board computer) or is supplied by an electronics system provided in any vehicle electronic component which is connected to a data bus (e.g. CAN bus). The RFID read/write processes as such and/or for example, the retrieval of (temporarily stored) read results can be carried out, for example, by technical staff in a workshop.

In addition to a rapid and reliable detection of the built-in components, the on-board RFID system shown is also of interest with regard to protection from counterfeits (the transponder or its function can each represent an authenticity feature of the relevant components). The invention therefore also provides an advantageous method for checking the authenticity of articles.

Unlike the exemplary embodiment shown, the RFID system of the vehicle 48*m* could also comprise an antenna device in the passenger compartment and/or in the loading area (trunk space) (alternatively or additionally to the antennas 20*m*-1, 20*m*-2 shown in the engine compartment). Thus, a detection or identification of interior components or loading area components (fixedly installed or the load material itself) could also advantageously be made.

RFID antenna devices (e.g. specially provided antennas or modified interior components) for checking the passenger compartment could also be provided, e.g. laterally on the doors and/or under the roof of the relevant vehicle. Thus, for example, in a motor vehicle of the type shown in FIG. 15, in particular, for example, seats, airbags etc, can be scanned and checked.

In the loading area or trunk space of a vehicle of the type shown in FIG. 15, a check of the safety equipment, for example (e.g. warning triangle, expiry date of first aid kit etc.) could advantageously be made.

If monitoring of the loading area is provided, it is advantageous if the RFID system can be operated by a user of the vehicle. For this purpose, the RFID system can be integrated, for example, in the vehicle electronics which is present in any case.

Unlike the exemplary embodiment shown, the vehicle 48*m* could also be a watercraft or aircraft, for example, A certain shielding of the container structure (e.g. metal bodywork parts) is essential for the function to achieve the advantages of the invention.

In summary, "RFID radio containers" for numerous applications have been described with the above exemplary embodiments. It is essential in this case to take into account a shielding which is advantageously used in the invention.

In many areas, selective, locally exactly defined RFID detection is necessary. Instead of expensive readers having sophisticated filter mechanisms which can separate the "right" from the "wrong" transponders, a "natural shielding effect" of three-dimensional structures (e.g. metal containers) can be used in the invention. Furthermore, antenna solutions and connection possibilities are presented which do not interfere with the actual usage purpose of the respective container. As a result RFID detection and identification can be achieved very simply in restricted space at very low costs.

The operating mode of the exemplary embodiments may be briefly outlined as follows:
1. Requirement: a container structure, i.e. a largely or almost closed metal construction having electromagnetic shielding properties in the frequency ranges relevant for the RFID system concerned (e.g. passive RFID at 13.56 or 840-980 MHz).
2. Purpose: objects located inside this container should be able to be uniquely detected by means of RFID.
3. Implementation: an RFID antenna device provided for communication with transponders is located in the receiving compartment of the container. For this purpose, for example, parts of a metal structure forming the container can be modified such that they act as RFID antennas without impairing the function of the container. It is worth noting that complex, space-consuming antennas or RFID readers need not be integrated in known containers but parts of the containers can be modified such that they themselves act as antennas. As a result, the container itself becomes the antenna and therefore a component of the RFID system.

For example, antennas can be completely integrated in the side walls or the structure of the respective container. In many cases, individual or a plurality of walls or partitions can be designed as antennas themselves. As a result, neither the function nor the external form of the container is impaired. Integration of the antennas which are inserted seamlessly into the basic functionality of the individual container is preferably carried out.

In particular if only the antennas of the RFID system are integrated in various shielding containers (boxes, shelves, cabinets etc.), the required electrical connections can be guided externally by means of commercially available plug connectors (or other electrical connecting means).

As a result, for example, various transport containers (e.g. catering trolleys in aircraft, valuables containers etc.) can be connected very simply. With the aid of a type of bus system a plurality of antennas (containers) can be operated sequentially without major modifications to the existing structure being necessary.

If necessary, the RFID reader itself can be built into the individual container. This has the advantage, for example, that the respective container can be operated independently of external readers.

When using HF cables, the required cable length or the HF technical matching must be taken into account. In the simplest case only the cables are required for the antennas since the reader itself is located externally. It is also possible to operate a larger number of antennas on a reader and wire accordingly by means of so-called HF (UHF) multiplexers. By this means a plurality of containers e.g. on board a vehicle (e.g. a truck) can be detected with only one reader.

All antenna forms can be integrated directly in one of the side walls or other boundaries of the container or installed subsequently. It should be noted that usually an antenna solution can be found whereby the enclosed volume can be completely "illuminated" electromagnetically. Depending on the dimensions of the container, resonant structures may be formed which very positively influence the detection of the content. For example, at a wavelength of about 33 cm in the UHF range, this can be achieved with relatively small dimensions.

The following antenna forms may be used in particular:
1. Rod Antennas

The classical trunk radio antenna is also suitable for RFID. Struts, corner or edge reinforcements of a container can expediently be configured as rod antennas.

2. Dipole Antenna

The two-armed dipole antenna in different designs and lengths can bridge large dimensions and completely illuminate a corresponding metal structure. A plurality of antennas can be used if selective detection is required.

3. Surface Antenna (Patch Antenna)

This type of antenna is ideally suited to use entire side walls or parts thereof as antennas. This facilitates installation or modification and in no way interferes with the usage properties of the container. Some examples for the arrangement of patch antennas were described with reference to FIGS. 10 and 11. FIG. 10 shows a design in which substantially the entire side wall acts as an individual antenna, whereas FIG. 11 uses an antenna cascade for illuminating the entire container.

4. Emitter

UHF emitters can be configured, for example as horn emitters and used to feed high-power-density radiation into narrow spaces.

5. Induction Coils for the HF Range

Coils in the form of conductor (e.g. metal wire) windings let into boundaries (e.g. walls of the container) which ensure inductive coupling with the transponders can be used in particular for the use of HF-RFID at 13.56 MHz.

The invention has a very wide spectrum of application. Some examples will be explained again in detail hereinafter.
1. IT Server Rack Such an application has already been explained above with reference to FIGS. 1 to 6. Some possible detailed aspects of this application are given again hereinafter:

A preferred usage is obtained for example for "19 inch IT cabinets" (server racks).

Use of rod, dipole or surface antennas. A possible design of an RFID-IT rack uses rod antennas which are built in subsequently or configured as modified parts of an internal container structure. The connections are inserted, for example, with the usual IT cables together into the rack.

Exchange of one or more side walls by entire surface antennas.

Connection of the antenna cable by standard (click) plugs which can be attached very easily to the rack.

Introduction of different transponder types for identification (a) of the cabinet itself, (b) the individual server (content), and (c) the individual locations e.g. one transponder per height unit (one height unit U corresponds to one inch. Large racks have a height up to 42 U).

If one of more height units of a built-in server are occupied, the place tags can no longer be read. The occupancy can be determined not only in terms of content but also spatially exactly by means of simple subtraction.

2. Telecommunications Rack

The telecommunications rack should be considered similarly to the IT rack. However, some additional features can be provided.

The dimensions can vary substantially, from typical 19 inch racks to small boxes for telephone equipment.

Active components (e.g. switches, routers) and passive components (e.g. patch panels) are typically installed.

Conventional switchgear cabinets for electrical installation technology in buildings can also be fitted with integrated antennas for identification of the components container therein, e.g. fuses, switches etc.

3. Transport Containers

Primarily all container types known from the prior art as such, particularly for sea and land transport, for example, come into consideration. As a result of the typically considerable size of such containers, cascaded patch antennas can be advantageous. These can be integrated, for example, in the side walls. Stacked containers can be networked as it were and therefore sequentially read out by standard or special plug connections or the like. Another possibility is to connect a reader from outside directly by means of plugs. The "electronic seals" already in use today can thus directly detect the content of the container and optionally relay it (e.g. via satellite).

4. Vehicles and Cases for Transporting Valuables

These include special containers, for example, for:
military security transport,
transport of hazardous goods,
transport of medicaments or pathogens,
transport of money and jewelry etc.

Apparatus for receiving or holding containers is frequently provided in known transport vehicles. If the antenna connections are contacted via locking plug connectors, the content can be detected as soon as the container is in its correct place. If it is removed without authorization, an alarm can be triggered immediately. A certain double function is thereby achieved.

5. Containers, Receptacles, Cases for Art Objects

The facts described previously under 3. and 4. apply to these transport containers. The following extensions can be additionally introduced by integrating RFID antennas:

Reading out radio sensors attached to art objects, which can typically also operate in the UHF range. As a result, vibrations, humidity, temperature etc. during transport can be monitored for each individual item.

Seamless monitoring of the transport sequence by correlating the individual readings with the whereabouts. It is known, for example, whether the container is connected straight to a reader in the vehicle, in the storage area, or in the exhibition area.

A completely transparent solution is obtained in connection with an electronic seal.

6. "Trolleys"

Roll containers with catering in aircraft are meant here, for example, which can provide detailed information about the loading using means within the scope of the invention. Furthermore, the preparation cycle, e.g. cleaning, maintenance, filling etc. can be displayed at any time for individual containers. Surface, dipole or rod antennas can also be used here.

It has been shown how the RFID write-read process can be exactly defined locally by using a shielding. Possibilities for retrofitting containers already in use such that their usage is not impaired have been described.

The invention claimed is:

1. A container, comprising:
a receiving compartment for receiving articles provided with RFID transponders,
a shielding for radiation shielding of the receiving compartment, and
an RFID antenna device comprising at least one antenna for communication with the RFID transponders, which is located in the receiving compartment and which is electrically connected or connectable to an RFID reader,
wherein the container comprises retaining means providing fixedly predefined receiving positions for the articles to be accommodated as desired in the receiving compartment,
wherein the antenna is formed by an element extending continuously over the receiving positions, or wherein a corresponding plurality of individual antennas is provided, and
wherein for detection of the occupancy of the individual receiving positions, other RFID transponders are distributed in the receiving compartment, wherein the communication of the RFID other transponders with the RFID antenna device is deteriorated corresponding to the occupancy of the individual receiving positions, and
wherein for each predefined receiving position there is provided a RFID transponder of the other RFID transponders, the communication between the RFID transponder of the other RFID transponders and the RFID antenna device being shielded by an accommodated article in the corresponding receiving position.

2. The container according to claim 1, wherein the radio shielding of the RFID transponder of the other RFID transponders is accomplished by a metal housing structure of the accommodated article.

3. The container according to claim 1, further comprising a mechanical container structure, wherein the element that forms the antenna is part of the mechanical container structure.

4. The container according to claim 3, wherein the antenna is formed by an elongate strut of the mechanical container structure.

5. The container according to claim 1, wherein the antenna is a flat extended antenna.

6. The container according to claim 1, wherein the corresponding plurality of individual antennas is provided to detect the exact positions of the articles located in the receiving compartment.

7. The container according to claim 1, further comprising an externally accessible electrical connection device.

8. The container according to claim 1, further comprising at least one RFID transponder, which is located inside the receiving compartment and provides RFID-readable data relating to the container.

9. The container according to claim 1, wherein the articles to be received are at least one of electrical or electronic appliances.

10. The container according to claim 1, further comprising a sensor device.

11. An RFID system, comprising at least one container according to claim 1 and at least one reader for identifying the transponders located in the container using the RFID antenna device located in the radiation-shielded receiving compartment.

12. The RFID system according to claim 11, wherein the reader is connected to a multiplex device for connection of a plurality of RFID antennas.

13. The RFID system according to claim 11, wherein the container is a mechanical structure.

14. The container according to claim 3, wherein the element forming the antenna is a supporting element of the mechanical container structure.

15. The container according to claim 5, wherein the flat extended antenna is formed by at least one of a lateral section, upper section or lower section of the mechanical container structure.

16. The container according to claim 9, wherein the articles to be received is an IT rack.

* * * * *